(12) United States Patent
Langenfeld

(10) Patent No.: US 9,802,646 B1
(45) Date of Patent: Oct. 31, 2017

(54) VEHICLE WITH STEERING MECHANISM

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/231,112

(22) Filed: Aug. 8, 2016

Related U.S. Application Data

(63) Continuation of application No. 14/535,664, filed on Nov. 7, 2014, now Pat. No. 9,408,344.

(60) Provisional application No. 61/919,423, filed on Dec. 20, 2013, provisional application No. 61/902,108, filed on Nov. 8, 2013.

(51) Int. Cl.
| | | |
|---|---|---|
| *B62D 7/09* | (2006.01) | |
| *B62D 3/12* | (2006.01) | |
| *B62D 7/16* | (2006.01) | |
| *B62D 61/06* | (2006.01) | |
| *A01D 34/00* | (2006.01) | |
| *A01B 69/00* | (2006.01) | |
| *A01D 101/00* | (2006.01) | |

(52) U.S. Cl.
CPC ............... *B62D 7/09* (2013.01); *B62D 3/126* (2013.01); *B62D 7/16* (2013.01); *B62D 61/065* (2013.01); *A01B 69/007* (2013.01); *A01D 34/006* (2013.01); *A01D 2101/00* (2013.01)

(58) Field of Classification Search
CPC .......... B62D 7/09; B62D 61/065; B62D 7/16; B62D 3/126; A01D 2101/00; A01D 34/006; A01B 69/007
See application file for complete search history.

(56) References Cited

U.S. PATENT DOCUMENTS

| | | |
|---|---|---|
| 665,270 A | 1/1901 | Rumely |
| 810,881 A | 1/1906 | Pfouts et al. |
| 849,145 A | 4/1907 | Ledwinka |
| 2,620,612 A | 12/1952 | De Eugenio |
| 2,891,370 A | 6/1959 | Orly |
| 3,780,504 A | 12/1973 | Haseloff |
| 4,024,695 A | 5/1977 | Haseloff |

(Continued)

FOREIGN PATENT DOCUMENTS

| | | |
|---|---|---|
| EP | 1180468 | 2/2002 |
| WO | WO 2012091699 | 7/2012 |

OTHER PUBLICATIONS

U.S. Appl. No. 14/577,441, filed Dec. 19, 2014.

*Primary Examiner* — Drew J Brown
(74) *Attorney, Agent, or Firm* — Neal, Gerber & Eisenberg LLP

(57) ABSTRACT

A steering mechanism for a vehicle having a frame and a prime mover is disclosed. Two steered wheels, steered by a steering mechanism, are near the front of the vehicle and a single non-steered wheel is near the rear of the vehicle. The vehicle has a deck that houses rotatable cutting blades. Portions of the deck are positioned in front of and adjacent each side of the rear wheel. A first rotatable cutting blade is positioned adjacent a first side of the rear wheel and a second rotatable cutting blade is positioned adjacent the opposite side of the rear wheel. One or more additional cutting blades are positioned in front of the rear wheel.

17 Claims, 5 Drawing Sheets

(56) References Cited

U.S. PATENT DOCUMENTS

| | | | |
|---|---|---|---|
| 4,335,567 A | | 6/1982 | Comer |
| 4,914,894 A | | 4/1990 | Geiger |
| 5,406,778 A | * | 4/1995 | Lamb .................... A01D 34/44 180/65.1 |
| 5,685,134 A | | 11/1997 | Thornburg |
| 5,823,284 A | | 10/1998 | Hoar et al. |
| 6,904,985 B2 | * | 6/2005 | Ferree .................... B60K 17/10 180/6.32 |
| 7,543,672 B2 | | 6/2009 | Codere et al. |
| 7,918,305 B2 | | 4/2011 | Scherbring et al. |
| 8,091,672 B2 | | 1/2012 | Gutsch et al. |
| 8,882,119 B2 | | 11/2014 | Burns, Jr. |
| 9,598,103 B1 | * | 3/2017 | Langenfeld ............ B62D 3/12 |
| 2002/0017780 A1 | * | 2/2002 | Erickson ................ B62D 3/12 280/771 |
| 2003/0019682 A1 | * | 1/2003 | Schaedler ............. A01D 34/69 180/308 |
| 2007/0144796 A1 | * | 6/2007 | Schaedler ............... B62D 7/08 180/6.24 |
| 2007/0284839 A1 | * | 12/2007 | Sasaoka ................. B62D 3/02 280/93.502 |
| 2013/0249179 A1 | * | 9/2013 | Burns, Jr. ............... B62D 3/02 280/93.504 |
| 2013/0282212 A1 | | 10/2013 | Michael et al. |
| 2014/0223878 A1 | | 8/2014 | Sassone |
| 2015/0014952 A1 | * | 1/2015 | Morikawa ........... B62D 7/1509 280/91.1 |

* cited by examiner

VEHICLE WITH STEERING MECHANISM

CROSS-REFERENCE TO RELATED APPLICATIONS

This application is a continuation of U.S. patent application Ser. No. 14/535,664, filed on Nov. 7, 2014, which claims the benefit of U.S. Provisional Patent Application No. 61/902,108, filed on Nov. 8, 2013 and U.S. Provisional Patent Application No. 61/919,423, filed on Dec. 20, 2013. The contents of the non-provisional application and both provisional applications are fully incorporated herein by reference.

BACKGROUND OF THE INVENTION

This invention relates to vehicles in general and in particular to lawn and garden tractors. Lawn and garden tractors typically have a frame supporting various components of the vehicle and have a prime mover for powering the vehicle. The prime mover powers and drives two or more wheels of the vehicle. Conventional lawn and garden tractors have four wheels—two front wheels and two rear wheels. Conventional lawn and garden tractors typically have a steering mechanism that steers the two front wheels to alter the direction of vehicle travel. Certain lawn and garden tractors have four steered wheels instead of two to provide a tighter turning radius. However, lawn and garden tractors with four steered wheels are more expensive than lawn and garden tractors with two steered wheels.

Other "zero-turn" lawn and garden tractors control the direction of vehicle travel by altering the speed and direction of rotation of the independently-driven pair of rear wheels, which may be used to allow such vehicles to make small or "zero" radius turns. Such zero-turn radius tractors are typically capable of turning around a center point that is located in line with the axis of rotation of the rear wheels and in between the outer sides of the two rear wheels. These zero-turn tractors typically have a pair of front casters, but in some such vehicles the front wheels are actively steered as well. In other similarly controlled zero-turn vehicles, the front wheels are the independently-driven pair of wheels. Such vehicles may have a pair of steered or non-steered rear wheels, a pair of rear casters or a single rear caster.

Lawn and garden tractors typically have two or more rotatable cutting blades, which are typically driven by the prime mover. The cutting blades are typically housed within a deck. The size and shape of the deck typically approximates the area of the rotational footprint of the cutting blades. In conventional lawn and garden tractors, the deck and the cutting blades are positioned between the set of front wheels and the set of rear wheels. Typical cutting blade configurations have either two or three full size cutting blades positioned adjacent one another across the width of the vehicle to create a cutting path. The width of the cutting path created by the cutting blades is typically similar to or slightly larger than the width of the wheelbase of the vehicle.

Certain lawn and garden tractors also have one or more collectors for collecting clippings created by the cutting blades. In some such lawn and garden tractors, the collector or collectors are attached to the deck such that the motion of the cutting blades propels the clippings into the collector(s). Some such lawn and garden tractors have a side discharge collector that is attached to a side of the deck and extends outward from the vehicle beyond the wheel base of the vehicle. This configuration creates a disadvantage by increasing the width of the vehicle, thereby making it more difficult to navigate around objects or through narrow paths. Side-discharge configurations also have a disadvantage of creating windrows, which are rows of dropped clippings, when the direction of vehicle travel is reversed.

In other such lawn and garden tractors, the collector is mounted rearward of the rear wheels. In tractors in which the deck is positioned between the front and the rear wheels, this rear-mount configuration requires a lengthy collector chute to connect the deck to the collector. The use of a lengthy chute increases the likelihood that the clippings will lose momentum and fall to the ground prior to reaching the collector, or that they will clog the collector chute.

SUMMARY OF THE INVENTION

The present invention teaches a three-wheeled mowing vehicle such as a lawn and garden tractor. The vehicle has a frame and a prime mover. The three wheels of the vehicle are configured so that two steered wheels are near the front of the vehicle and a single non-steered wheel is near the rear of the vehicle. The two steered wheels near the front of vehicle are steered by a steering mechanism. The vehicle has a deck that houses rotatable cutting blades that cut grass. A portion of the deck is positioned in front of the single rear wheel. Other portions of the deck are adjacent each side of the single rear wheel. A first rotatable cutting blade is positioned adjacent a first side of the rear wheel and a second rotatable cutting blade is positioned adjacent the opposite side of the rear wheel. One or more additional cutting blades are positioned in front of the rear wheel.

A vehicle according to the present invention is capable of being steered during a turn such that the center point of the turn is adjacent the deck—and therefore also adjacent one of the cutting blades—thereby allowing the cutting blades to cut along the edge of a small object such as a pole when the vehicle is steered around the pole. Turns around small objects can also be easily and intuitively executed because an operator seated in the vehicle can typically see the center point of the turn, and thus the small object. The use of a single rear wheel is less expensive than dual rear wheels and less expensive than tractors with steered front and rear wheels. Furthermore, this configuration also allows the deck to cut underneath bushes and other overhanging materials because the deck extends outward at a low height from the single rear wheel. By contrast, in conventional mowing vehicles, the deck only extends a short distance outward from the dual rear wheels, which cannot fit under low-hanging objects.

In one embodiment of the present invention, a collector is positioned rearward of the deck and connected to the deck via two collector chutes. In this embodiment, the rearward location of the collector minimizes the width of the collector and provides improved collection of clippings.

In certain embodiments, the steering mechanism is mounted to a steering support frame that is part of the vehicle frame. The steering support frame supports a steering shaft and a steering rack. The steering rack has a sector gear that is rotatably driven by a pinion on the steering shaft. The steering rack in turn rotates a first and second pivot arm, each of which is rotatably mounted on the steering support frame and coupled to the steering rack. The first and second pivot arms cause a first and a second steering arm to rotate, respectively. The first and second steering arms have first and second steered wheels mounted to them, respectively, so that rotation of the first steering arm causes the first steered wheel to be steered and rotation of the second steering arm causes the second steered wheel to be steered.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
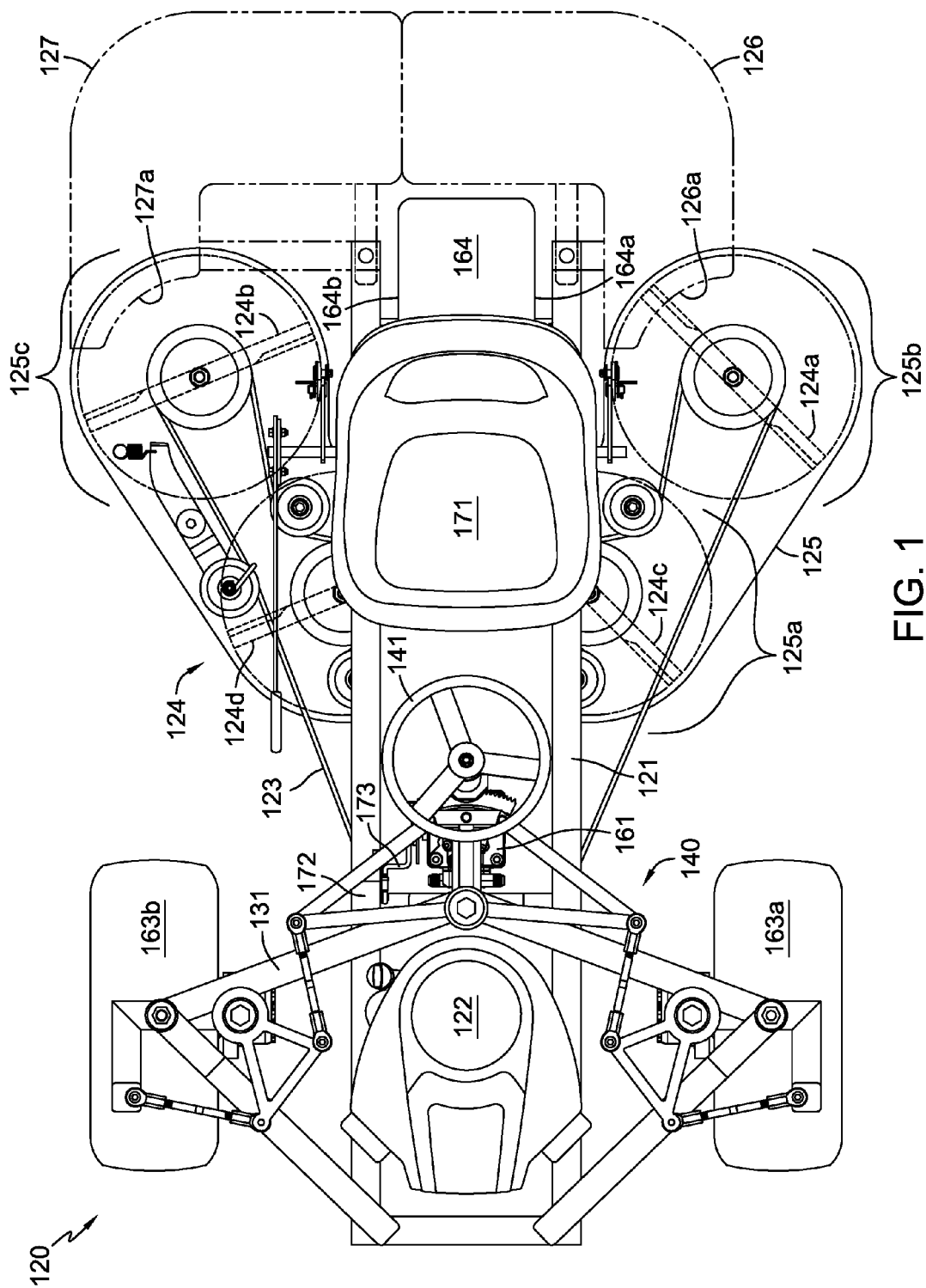
FIG. 1 is a top plan view of an embodiment of a three-wheeled mowing vehicle according to the teaching of the invention with certain components removed for clarity.

The description that follows describes, illustrates, and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 shows a mowing vehicle 120 having two steered front wheels 163a and 163b and a single non-steered rear wheel 164. Rear wheel 164 is rotatably mounted on a rear axle 165 (shown in FIG. 3) approximately along a longitudinal centerline 129 of vehicle 120. Rear wheel 164 has a first side 164a and a second side 164b. Vehicle 120 also has a vehicle frame 121, which supports various components of vehicle 120 as described in further detail below, including seat 171. Vehicle frame 121 includes a steering support frame 131, which supports various components of a steering mechanism 140, which steers front wheels 163a and 163b, as described in further detail below.

Figure 2:
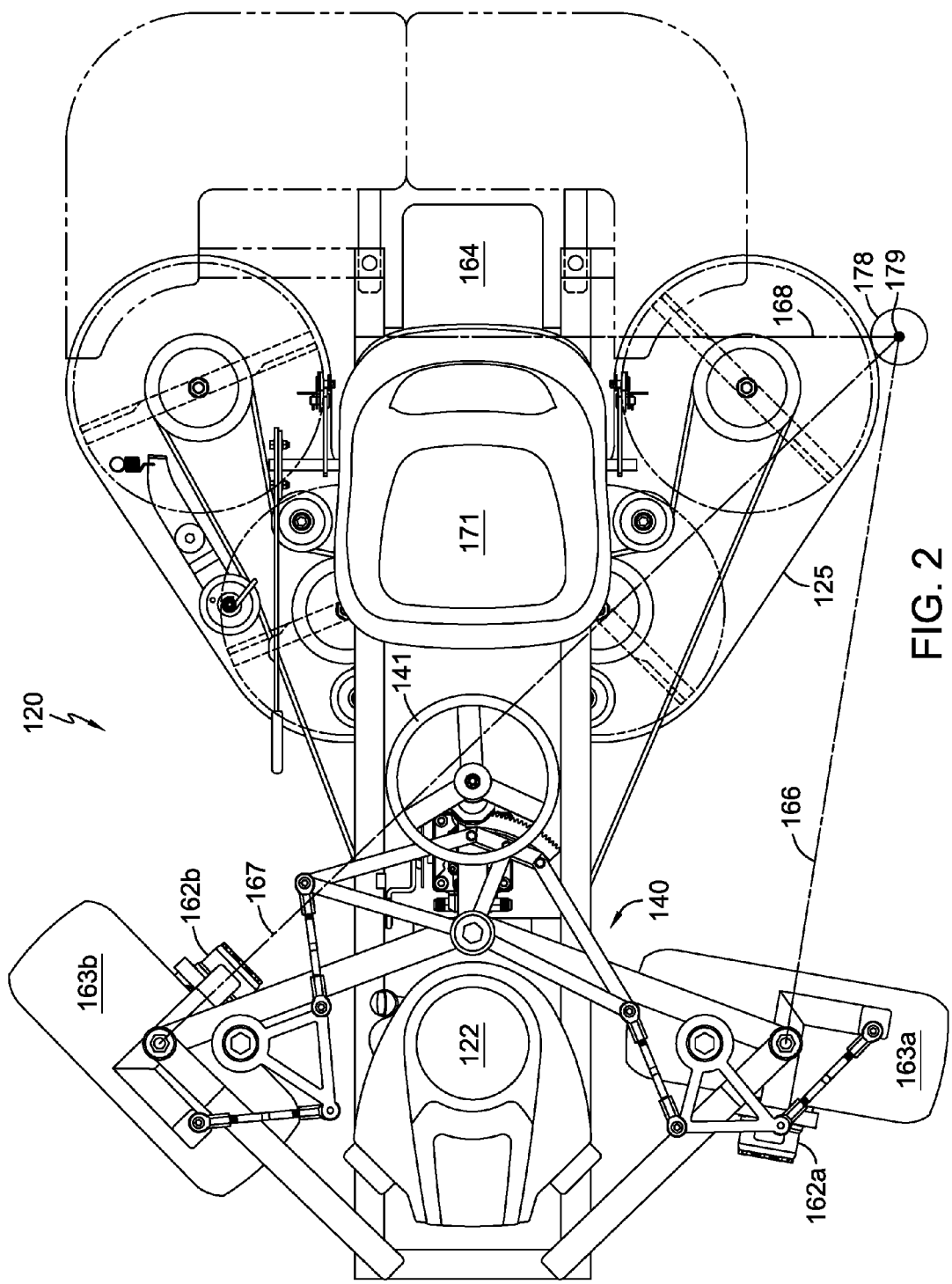
FIG. 2 is a top plan view of the mowing vehicle of FIG. 1 showing the front wheels turned to demonstrate mowing around a small object.

A prime mover 122 is mounted to vehicle frame 121. Prime mover 122 provides power to propel vehicle 120. As shown in FIGS. 1 and 2, prime mover 122 provides power to a pump 161. Pump 161 is in hydraulic communication with and drives wheel motors 162a and 162b. Methods of providing hydraulic communication between one or more pumps and one or more wheel motors of a vehicle are well-known in the art and are therefore not included in the illustrations to simplify the illustrations for better understanding of the invention. An operator provides input to pump 161 via pump input device 172, which is shown in this embodiment as a foot pedal. Pump input device 172 is coupled to pump 161 via pump control linkage 173. Pump input device 172 varies the output of pump 161, which in turn varies the speed of wheel motors 162a and 162b. Pump 161 may utilize a hydraulic differential to vary the speed of wheel motors 162a and 162b independently of one another.

Steered front wheels 163a and 163b, which are located near the front of vehicle 120, are mounted to and driven by wheel motors 162a and 162b, respectively. In this embodiment, wheel motors 162a and 162b are hydraulic geroller-type motors; however, it will be appreciated that other types of motors may be used. While a hydraulic drive system is shown in FIGS. 1 and 2, it will be appreciated by one of ordinary skill in the art that electric drive motors or other suitable drive systems known in the art may be used to drive wheels 163a and 163b. An alternative drive system is shown in U.S. Provisional App. No. 61/919,423, which is incorporated herein by reference. It will also be appreciated by one of skill in the art that rear wheel 164 could be driven by prime mover 122.

Prime mover 122 also drives a belt and pulley system 123 that is coupled to and drives cutting blades 124. As shown in FIG. 1, cutting blades 124 are housed within a deck 125. Deck 125 has a top and sidewall that cover and protect cutting blades 124. When viewed from above, deck 125 has a U-shape. A first portion of the deck 125a, which forms the base of the U-shape, is positioned in front of rear wheel 164. A second portion of the deck 125b and a third portion of the deck 125c extend rearward and adjacent to first and second sides 164a and 164b of rear wheel 164, respectively. A first cutting blade 124a is positioned within deck 125 adjacent rear wheel first side 164a and a second cutting blade 124b is positioned within deck 125 adjacent rear wheel second side 164b, such that axis 168 of rear axle 165 intersects both first cutting blade 124a and second cutting blade 124b. A third cutting blade 124c and a fourth cutting blade 124d are positioned within deck 125 and forward of rear wheel 164. As shown in the embodiment in FIG. 1, cutting blades 124a, 124b, 124c and 124d are generally the same size as one another, and it will be understood that these two blades 124c, 124d could be overlapped. It will be understood that deck 125 may be articulated and/or include supporting wheels or rollers to prevent scalping, as is known in the art. It is contemplated that the position, as illustrated, of certain portions of deck 125 in relation to rear wheel 164 may contribute to the overall stability of vehicle 120, i.e., with deck portions 125b and 125c functioning as vehicle tip-limiters or outriggers.

Additionally, in a similar embodiment of the invention (not shown), deck 125 may be divided into multiple decks, such that each deck portion 125a, 125b, and 125c, for example, is independently supported on vehicle frame 121.

In another similar embodiment of the invention (not shown), each cutting blade 124a, 124b, 124c, and 124d, for example, may be housed within its own separate deck, with each of these decks supported on vehicle frame 121.

In one embodiment, as shown in FIG. 1, a first collector 126 and a second collector 127 are mounted to vehicle 120. Collectors 126 and 127 collect clippings of grass or the like that are cut by cutting blades 124. Collectors 126 and 127 are positioned generally rearward of deck 125, and portions of collectors 126 and 127 are positioned rearward of rear wheel 164. It will be understood that collectors 126 and 127 are optional equipment, collectors 126 and 127 are shown generically, and that portions of collectors 126 and 127 could be positioned above rear wheel 164. A first collector chute 126a connects first collector 126 to deck 125 at second portion of the deck 125b to receive clippings and transfer them to first collector 126. Similarly, a second connector chute 127a connects second collector 127 to deck 125 at third portion of the deck 125c to receive clippings and transfer them to second collector 127. As shown in FIGS. 1 and 2, wherein cutting blades 124 rotate clockwise, collector chutes 126a and 127a may be positioned to the right side of second portion of the deck 125b and third portion of the deck 125c to better align the collector chutes 126a and 127a with the path in which clippings are propelled by cutting blades 124. Although the embodiment depicted shows two separate collectors, it is contemplated that a single collector may be used instead.

FIG. 2 depicts vehicle 120 executing a left turn about a small object 178. As shown in FIG. 2, steered front wheels 163a and 163b are turned at different angles from the forward direction of travel to approximate Ackermann steering. Specifically, steered front wheels 163a and 163b are turned such that axis of rotation 166 of the first steered front wheel 163a and axis of rotation 167 of the second steered front wheel 163b intersect at center or pivot point of the turn 179, which corresponds to the center point of small object 178. As shown in FIG. 2, the edge of deck 125 follows the edge of small object 178, thereby allowing vehicle 120 to trim closely around the edge of small object 178. Thus, vehicle 120 can mow around small object 178 in a single, uninterrupted, constant radius or circumferential turn without requiring an operator of vehicle 120 to make a series of steering adjustments. It should be noted that small object 178 is merely representative of a small object generally and is not the smallest object around which vehicle 120 is capable of mowing. Vehicle 120 is capable of a tighter turn than illustrated in FIG. 2. Specifically, vehicle 120 can approximately mow about a single point located along axis 168 of rear axle 165. Due to this uninterrupted turning capability about a small object, it will be understood by those skilled in the art that vehicle 120, i.e., deck, wheels and steering configuration, is well-suited to electronic, robotic control, as well as human operator control.

Figure 3:
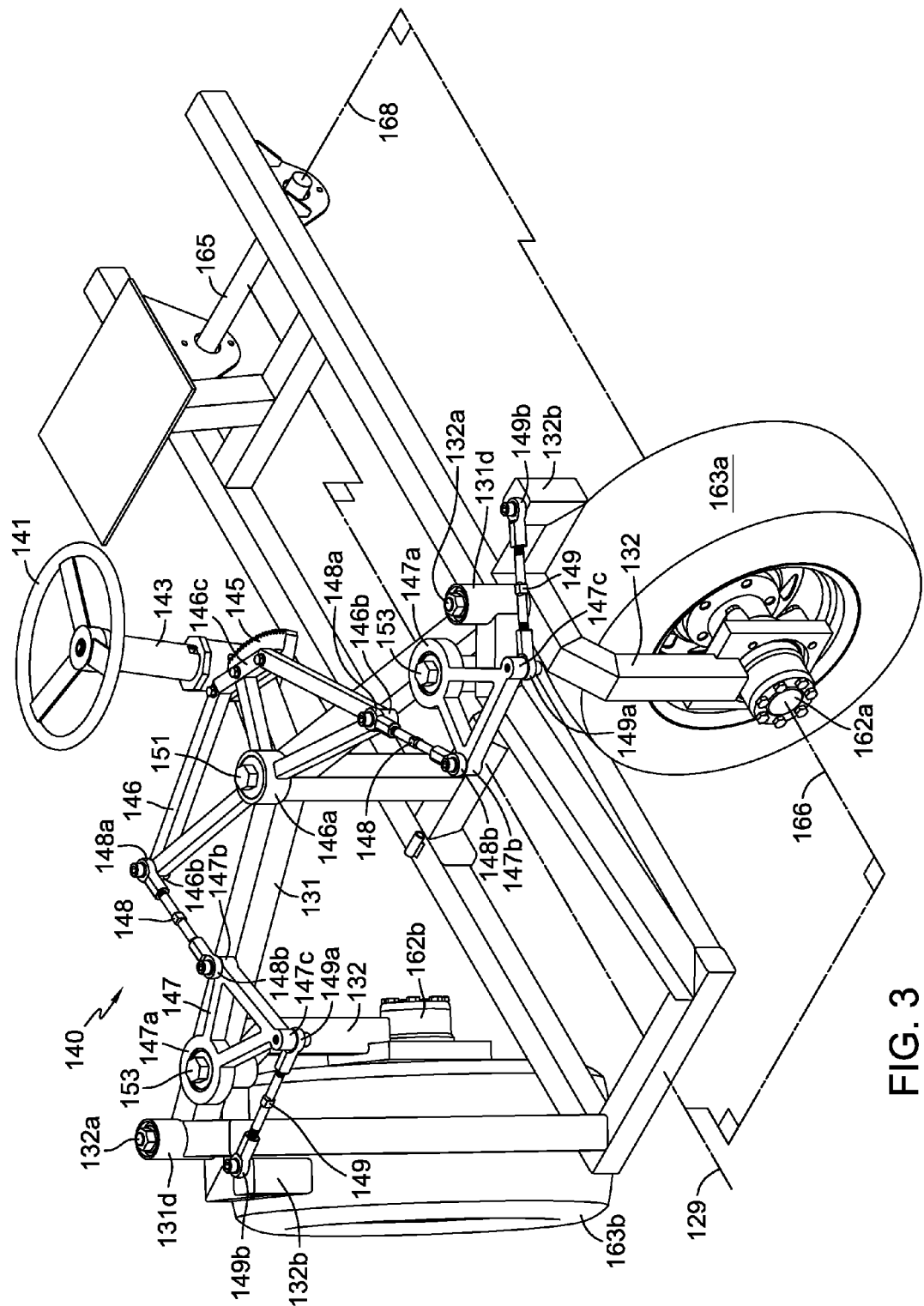
FIG. 3 is a top perspective view of a portion of the mowing vehicle of FIG. 1 including the steering mechanism and the steering support frame.
Figure 4:
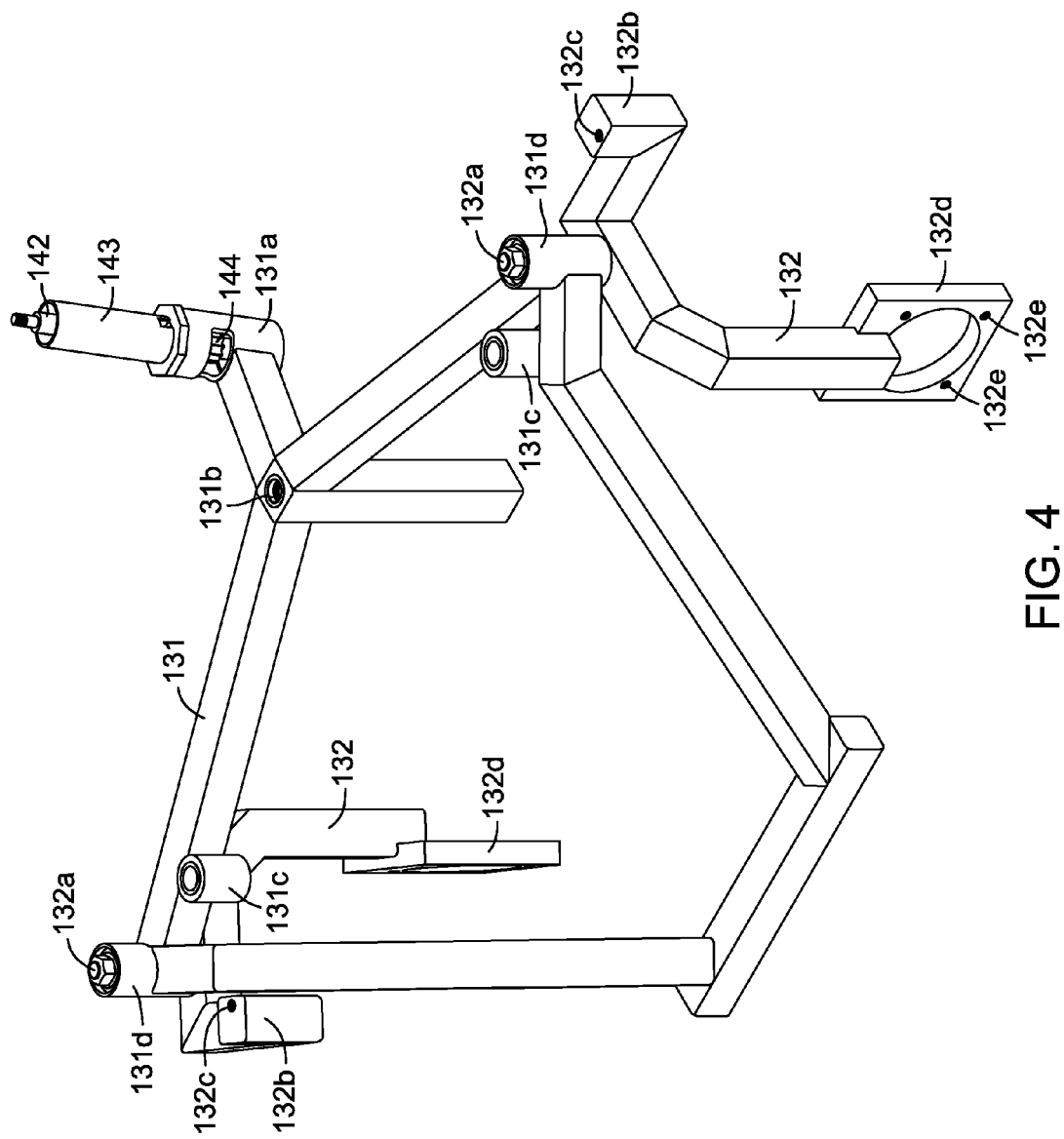
FIG. 4 is a top perspective view of the steering support frame of FIG. 3.

FIGS. 3 and 4 show details of steering support frame 131 and steering mechanism 140. Steering support frame 131 supports and provides mounting locations for multiple components of steering mechanism 140, described in detail below. In particular, steering support frame 131 has a steering column pivot 131a. In this embodiment, steering column pivot 131a is a cylindrical member having a cylindrical opening to receive one or more bearings and other components. Steering column pivot 131a is approximately located along vehicle longitudinal centerline 129. Steering support frame 131 also has a steering rack pivot support 131b that includes a cylindrical opening to receive a pin or fastener. Steering rack pivot support 131b is located along longitudinal centerline 129 of vehicle 120 and forward of steering column pivot 131a. Steering support frame 131 also has a pair of pivot arm pivot supports 131c. Pivot arm pivot supports 131c include cylindrical openings to receive pins or fasteners and are located outboard from longitudinal centerline 129 of vehicle 120. Steering support frame 131 also has a pair of steering arm pivots 131d that include cylindrical openings to receive bearings and pins or fasteners. Steering arm pivots 131d are located outboard from longitudinal centerline 129 of vehicle 120. As described in detail below, steering column pivot 131a, steering rack pivot support 131b, pivot arm pivot supports 131c, and steering arm pivots 131d provide mounting locations for components of steering mechanism 140 to be rotatably mounted to steering support frame 131.

Steering mechanism 140 has a steering input device 141, shown in FIG. 3 as a steering wheel. A plurality of linkages, which are described below, connect steering input device 141 to steered wheels 163a and 163b. Steering input device 141 is mounted to a steering shaft 142 that is rotatably disposed in a sheering shaft housing 143 and rotatably mounted in steering column pivot 131a. Pinion 144 is mounted on steering shaft 142, such that rotation of steering shaft 142 rotates pinion 144.

Steering rack 146 has a sector gear 145 mounted thereto via a sector gear mount 146c. Sector gear 145 meshes with pinion 144 such that rotation of pinion 144 causes rotation of sector gear 145 and thus rotation of steering rack 146. Steering rack 146 has a steering rack collar 146a for receiving a bearing and rotatably mounting steering rack 146 to steering support frame 131 at steering rack pivot support 131b. A steering rack kingpin bolt 151 passes through steering rack collar 146a and into steering rack pivot support 131b, thereby rotatably connecting steering rack 146 to steering support frame 131. Thus, rotation of steering shaft 142 causes rotation of steering rack 146 about steering rack kingpin bolt 151.

A pair of pivot arms 147 are rotatably connected to: (i) steering rack 146 via connectors, shown in this embodiment as tie rods 148; (ii) steering support frame 131 at pivot arm pivot supports 131c; and (iii) steering arms 132 via links 149. With respect to the connection of pivot arms 147 to steering rack 146, each tie rod 148 has a tie rod first pivot 148a on one end of tie rod 148 and a tie rod second pivot 148b on the opposite end of tie rod 148. Tie rod first pivots 148a are rotatably connected to tie rod mounting bosses 146b on steering rack 146. Tie rod second pivots 148b are rotatably connected to pivot arm tie rod mounting bosses 147b on pivot arms 147.

Pivot arms 147 are rotatably mounted to steering support frame 131 at pivot arm pivot supports 131c and pivot arm collars 147a via pivot arm kingpin bolts 153. Kingpin bolts 153 pass through bearings in pivot arm collars 147a and into pivot arm pivot supports 131c. Thus, rotation of steering rack 146 causes pivot arms 147 to rotate about pivot arm kingpin bolts 153.

Pivot arms 147 are also rotatably connected to steering arms 132 via links 149. In particular, each link 149 has a link first pivot 149a on one end of link 149 and a link second pivot 149b on the opposite end of link 149. Each link first pivot 149a is rotatably connected to pivot arm 147 via link a mounting boss 147c on pivot arm 147. Each link second pivot 149b is rotatably connected to a lever arm 132b on steering arm 132 by a fastener or pin that passes through pivot 149b and into a link attachment opening 132c formed in lever arm 132b.

Steering arms 132 are rotatably mounted on steering support frame 131 at steering arm pivots 131d. In particular, steering arm kingpin bolts 132a rotatably connect each steering arm 132 to steering arm pivots 131d on steering support frame 131. Thus rotation of pivot arms 147 causes rotation of steering arms 132 about steering arm kingpin bolts 132a.

Each steering arm 132 extends downward from a lever arm 132b and connects to a wheel motor mounting flange 132d. Wheel motors 162a and 162b are mounted to wheel motor mounting flanges 132d via bolts passing through wheel motor mounting bolt holes 132e formed in wheel motor mounting flanges 132d and into wheel motors 162a and 162b. Steered wheels 163a and 163b are mounted to wheel motors 162a and 162b, respectively.

Thus, rotation of steering wheel 141 causes rotation of steering rack 146, which in turn rotates pivot arms 147. Rotation of pivot arms 147 causes rotation of steering arms 132, to which steered wheels 163a and 163b are mounted, thereby steering steered wheels 163a and 163b. In the embodiment shown, tie rods 148 and links 149 can be adjusted to affect wheel alignment.

FIG. 3 shows steering mechanism 140 positioned in its maximum left hand turn condition. In this condition, rotational axis 166 of leading steered wheel 163a is oriented parallel to longitudinal centerline 129 of vehicle 120 and perpendicular to axis 168 of rear axle 165 and non-steered wheel 164. When steering mechanism 140 is positioned in its maximum right hand turn condition (not shown), wheel 163b is the leading steered wheel and rotational axis 167 of leading steered wheel 163b is oriented parallel to longitudinal centerline 129 of vehicle 120 and perpendicular to rotational axis 168 of non-steered wheel 164.

Figure 5:
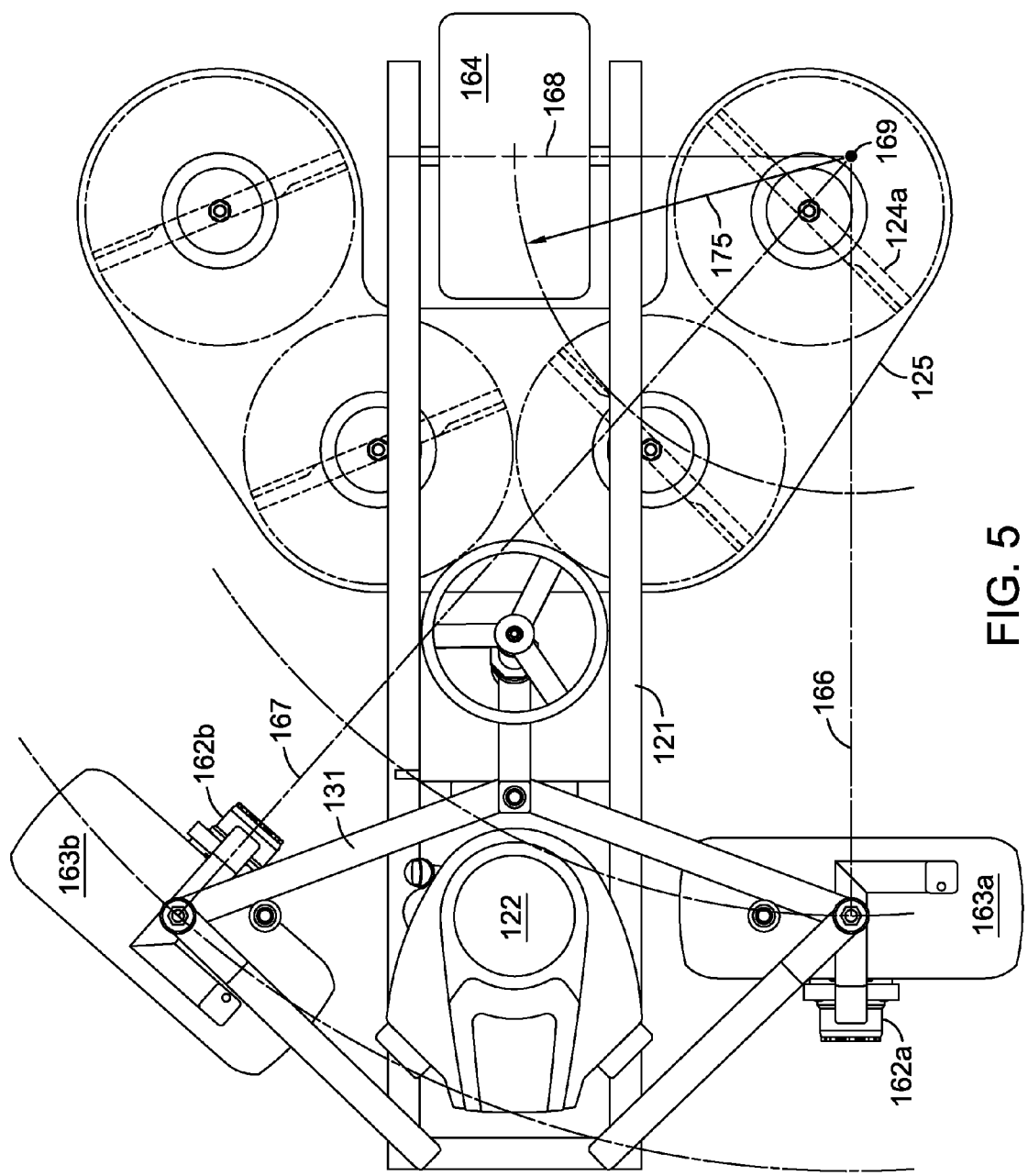
FIG. 5 is a top plan view of a portion of the vehicle of FIG. 1 showing the front wheels turned to demonstrate a turn.

FIG. 5 shows certain portions of vehicle 120 to illustrate vehicle 120 positioned in its maximum left hand turn condition that corresponds with the position of steering mechanism 140 shown in FIG. 3. As shown in FIG. 5, axis of rotation 166 of first steered wheel 163a and axis of rotation 167 of second steered wheel 163b intersect along rotational axis 168 of non-steered rear wheel 164 at pivot point 169. Pivot point 169 is the pivot point of the minimum vehicle turning radius 175, and pivot point 169 is located underneath deck 125 and cutting blade 124a. Therefore, during this turn there will be no uncut portion of grass around the inner radius of the turn. As shown in FIG. 5, rear wheel 164 will follow an arc having radius 175, thereby executing a turn that does not leave uncut grass on the interior of the turn while at the same time minimizing turf or other surface scrubbing by rear non-steered wheel 164.

The geometric relationships described above and shown in FIGS. 3 and 5 are specific to the embodiment shown and are not requirements or limitations of the invention. In other embodiments the leading steered wheel, e.g., wheel 163a in FIG. 5, can be steered to an angle greater than or less than ninety degrees in relation to longitudinal centerline 129 of vehicle 120 and still have the rotational axes of the leading and trailing steered wheels intersect at a point under deck 125.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vehicle comprising:
   a vehicle frame having a longitudinal centerline;
   a steering mechanism supported by the vehicle frame;
   a first steered front wheel engaged to the steering mechanism and having a first axis of rotation, a second steered front wheel engaged to the steering mechanism and having a second axis of rotation;
   a rear axle supported by the vehicle frame rearward of the first and second front wheels, the rear axle having an axis extending therethrough; and
   at least one rear wheel mounted on the rear axle such that the at least one rear wheel intersects or is capable of intersecting the longitudinal centerline of the vehicle frame;
   wherein the steering mechanism is configured to enable a first turn of the vehicle in which the first axis of rotation intersects the second axis of rotation at a point exterior to the vehicle frame, such that a first reference line defined as being normal to flat ground and extending through the point does not intersect any portion of the vehicle frame.

2. The vehicle of claim 1, wherein the axis of the rear axle intersects the point during the first turn.

3. The vehicle of claim 2, wherein the steering mechanism comprises at least one steering input device configured to receive a plurality of user-specified steering inputs; the vehicle being configured such that a first steering input at the at least one steering input device enables the first turn by causing the first axis of rotation to intersect the second axis of rotation at the point.

4. The vehicle of claim 3, further comprising a first wheel motor that drives the first steered front wheel and a second wheel motor that drives the second steered front wheel, wherein the first axis of rotation intersects the first wheel motor and the second axis of rotation intersects the second wheel motor.

5. The vehicle of claim 1, wherein the steering mechanism is rotatably mounted to a steering support frame.

6. The vehicle of claim 5, wherein the steering support frame comprises:
   a steering column pivot intersecting the longitudinal centerline of the vehicle frame and at least partially housing a steering shaft connected to at least one steering input device configured to receive a plurality of user-specified steering inputs;
   a steering rack pivot support intersecting the longitudinal centerline of the vehicle frame;
   a first steering arm pivot support defining a first cylindrical opening and a second steering arm pivot support defining a second cylindrical opening; and
   first and second steering arm pivots.

7. The vehicle of claim 6, wherein the steering mechanism comprises:
   a steering rack rotatable about the steering rack pivot support;
   a first pivot arm rotatable about the first steering arm pivot support and a second pivot arm rotatable about the second steering arm pivot support; and
   a first steering arm rotatable about the first steering arm pivot support and a second steering arm rotatable about the second steering arm pivot support.

8. The vehicle of claim 7, wherein the steering rack comprises a sector gear meshed with a pinion fixed to the steering shaft.

9. The vehicle of claim 7, wherein the first pivot arm is connected to: (a) the steering rack via a first tie rod, (b) the first steering arm pivot support via a first pin, and (c) the first steering arm via a first link.

10. The vehicle of claim 9, wherein the first pivot arm is (a) triangular, (b) pivotable about the first pin extending through the first cylindrical opening of the first steering arm pivot support and the first pivot arm, and (c) rotatable about:

(i) a first pivot pin extending through the first pivot arm and the first tie rod, and (ii) a second pivot pin extending through the first pivot arm and the first link.

11. The vehicle of claim 10, wherein a pivot point defined along the first pin and two rotation points respectively defined along the first and second pivot pins form vertices of the triangular first pivot arm.

12. The vehicle of claim 7, wherein the first steering arm comprises: a first portion, a second portion, a third portion, a fourth portion, and a motor mounting flange; wherein
the first portion vertically extends, in a direction parallel to the steering shaft, from the second portion;
the second portion is L-shaped and receives a steering arm pin that passes through the first steering arm pivot support;
the third portion extends from the second portion and is angled with respect to both of the second portion and the fourth portion;
the fourth portion extends vertically downward from the third portion and connects to the motor mounting flange; and
the motor mounting flange includes a flat surface that defines a plurality of wheel motor mounting bolt holes that support a first wheel motor that drives the first steered front wheel.

13. The vehicle of claim 9, wherein the first steering arm is pivotable about a steering arm pin that passes through the first steering arm pivot support, and rotatable about a pivot pin that passes through the first link.

14. The vehicle of claim 13, wherein the first steering arm is fixed to the first steered front wheel and a first wheel motor that drives the first steered front wheel such that the first steered front wheel and the first wheel motor rotate with the first steering arm.

15. The vehicle of claim 7, configured such that:
user actuation of the at least one steering input device induces rotation of the steering rack about the steering rack pivot support;
rotation of the steering rack about the steering rack pivot support induces rotation of the first and second pivot arms about the first and second steering arm pivot supports, respectively;
rotation of the first and second pivot arms about the first and second steering arm pivot supports induces rotation of the first and second steering arms about the first and second steering arm pivots, respectively; and
rotation of the first and second steering arms about the first and second steering arm pivots induces rotation of the first and second steered front wheels.

16. A vehicle comprising:
a vehicle frame having a longitudinal centerline;
a steering mechanism supported by the vehicle frame;
a first steered front wheel engaged to the steering mechanism and having a first axis of rotation, a second steered front wheel engaged to the steering mechanism and having a second axis of rotation;
a rear axle supported by the vehicle frame rearward of the first and second front wheels, the rear axle having an axis extending therethrough;
at least one rear wheel mounted on the rear axle such that the at least one rear wheel intersects or is capable of intersecting the longitudinal centerline of the vehicle frame;
a first wheel motor that drives the first steered front wheel and a second wheel motor that drives the second steered front wheel, wherein the first axis of rotation intersects the first wheel motor and the second axis of rotation intersects the second wheel motor;
wherein the steering mechanism is configured to enable a first turn of the vehicle in which the first axis of rotation intersects the second axis of rotation and the axis of the rear axle at a point exterior to the vehicle frame; and
wherein, during the first turn of the vehicle, the point is exterior to the vehicle frame such that a first reference line defined as being normal to flat ground and extending through the point does not intersect any portion of the vehicle frame.

17. The vehicle of claim 16, wherein the steering mechanism is rotatably mounted to a steering support frame and the steering support frame comprises:
a steering column pivot intersecting the longitudinal centerline of the vehicle frame and at least partially housing a steering shaft connected to at least one steering input device configured to receive a plurality of user-specified steering inputs;
a steering rack pivot support intersecting the longitudinal centerline of the vehicle frame;
a first steering arm pivot support defining a first cylindrical opening and a second steering arm pivot support defining a second cylindrical opening; and
first and second steering arm pivots; and
wherein the steering mechanism comprises:
a steering rack rotatable about the steering rack pivot support;
first and second pivot arms respectively rotatable about the first and second steering arm pivot supports; and
first and second steering arms respectively rotatable about the first and second steering arm pivots.

\* \* \* \* \*